(12) United States Patent
Jin et al.

(10) Patent No.: US 10,715,444 B2
(45) Date of Patent: Jul. 14, 2020

(54) TRAFFIC VOLUME DETERMINATION SYSTEM UTILIZING ROAD-TO-VEHICLE COMMUNICATION

(71) Applicant: TOYOTA JIDOSHA KABUSHIKI KAISHA, Toyota-shi, Aichi-ken (JP)

(72) Inventors: Xin Jin, Nagoya (JP); Toshinori Takayama, Tokyo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 60 days.

(21) Appl. No.: 16/113,362

(22) Filed: Aug. 27, 2018

(65) Prior Publication Data

US 2019/0089634 A1 Mar. 21, 2019

(30) Foreign Application Priority Data

Sep. 15, 2017 (JP) .................................. 2017-177871

(51) Int. Cl.
*H04L 12/801* (2013.01)
*H04L 12/26* (2006.01)
*H04L 12/24* (2006.01)

(52) U.S. Cl.
CPC ............ *H04L 47/12* (2013.01); *H04L 41/142* (2013.01); *H04L 43/0882* (2013.01); *H04L 43/16* (2013.01)

(58) Field of Classification Search
CPC ... H04L 47/12; H04L 41/142; H04L 43/0882; H04L 43/16; G08G 1/00–1/22; G05D 1/0022

See application file for complete search history.

(56) References Cited

U.S. PATENT DOCUMENTS

| | | | |
|---|---|---|---|
| 8,583,362 B2 * | 11/2013 | Nagase | G08G 1/096833 701/414 |
| 2004/0225437 A1 * | 11/2004 | Endo | G01C 21/34 701/415 |
| 2007/0032946 A1 | 2/2007 | Goto et al. | |
| 2009/0082948 A1 * | 3/2009 | Hiruta | G08G 1/0104 701/117 |

FOREIGN PATENT DOCUMENTS

| | | |
|---|---|---|
| JP | 2005-284588 A | 10/2005 |
| JP | 2007-041294 A | 2/2007 |
| JP | 2014-241090 A | 12/2014 |

* cited by examiner

*Primary Examiner* — Ian N Moore
*Assistant Examiner* — Latresa A McCallum
(74) *Attorney, Agent, or Firm* — Hunton Andrews Kurth LLP

(57) ABSTRACT

A traffic volume determination system includes: a storage device configured to store a first table configured to store information identifying a first link and a second link having a correlation degree, which exceeds a threshold, of a traffic volume, and a second table configured to store information indicating a first reference traffic volume and information indicating a second reference traffic volume; and a computer configured to determine that the first link is closed when a probability that an first event and a second event occur at a same time is statistically significantly small, the first event being an event in which an actual traffic volume of the first link is significantly lower than the first reference traffic volume, the second event being an event in which an actual traffic volume of the second link is significantly higher than the second reference traffic volume.

3 Claims, 4 Drawing Sheets

Links: 61-64
Nodes: 71-73

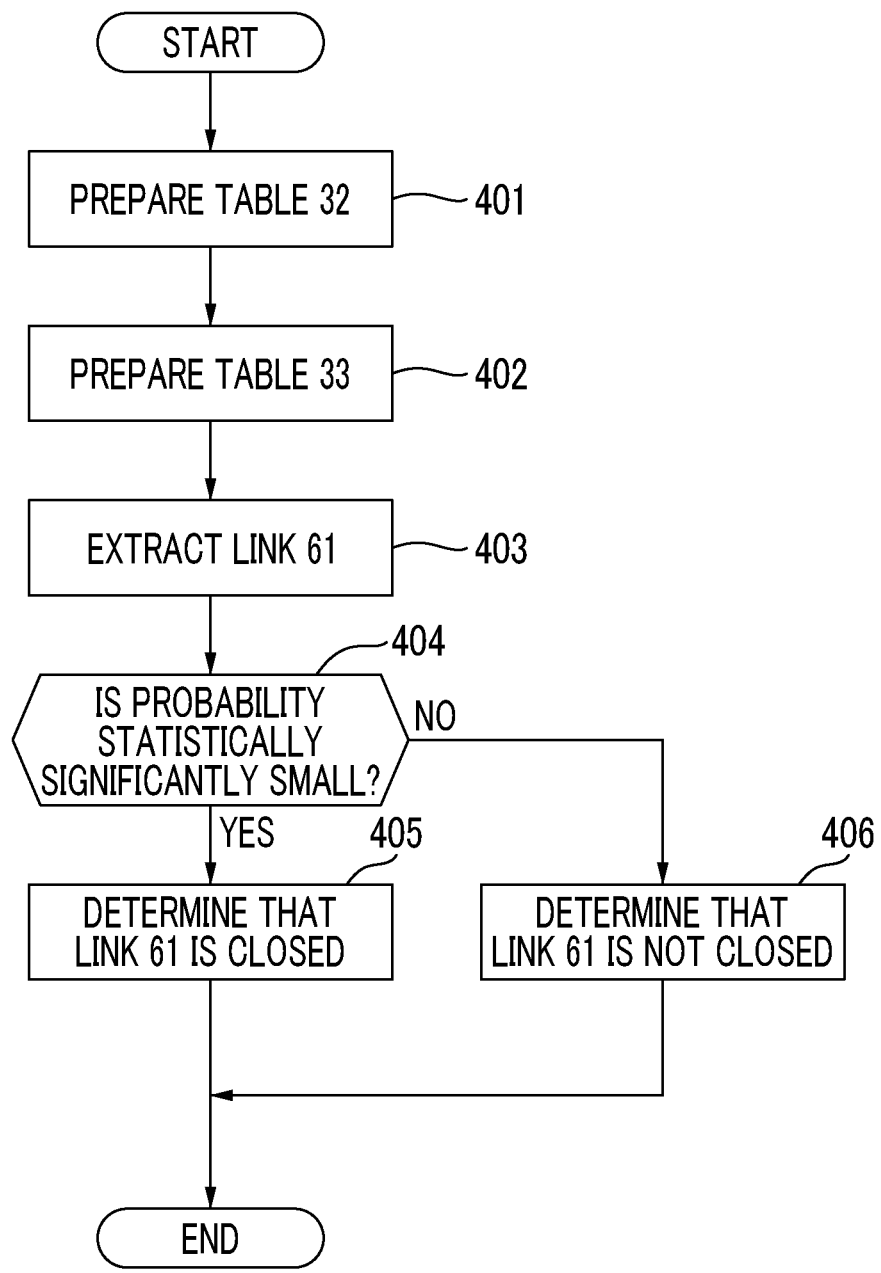

TRAFFIC VOLUME DETERMINATION SYSTEM UTILIZING ROAD-TO-VEHICLE COMMUNICATION

INCORPORATION BY REFERENCE

The disclosure of Japanese Patent Application No. 2017-177871 filed on Sep. 15, 2017 including the specification, drawings and abstract is incorporated herein by reference in its entirety.

BACKGROUND

1. Technical Field

The disclosure relates to a traffic volume determination system, a traffic volume determination method, and a non-transitory computer-readable storage medium storing a traffic volume determination program.

2. Description of Related Art

With the advancement of road-to-vehicle communication technology, collection of probe data by in-vehicle devices of vehicles traveling on roads has enabled the sequential accumulation of large amounts of traffic data with high precision. Accordingly, from time-series analyzation of the probe data for each road section, it is possible to analyze an average traffic volume and a moving history of vehicles. In view of the above trends, Japanese Unexamined Patent Application Publication No. 2014-241090 (JP 2014-241090 A) discloses a technology for detecting a traffic restriction and a release of the restriction of roads based on probe data representing a traveling trajectory of a vehicle. Japanese Unexamined Patent Application Publication No. 2005-284588 (JP 2005-284588 A) discloses a technology for matching a traveling trajectory of a vehicle obtained from probe data to a link on a map database, counting the number of vehicles that pass through for each of the matched links for a plurality of the vehicles, and determining that a traffic restriction has been imposed on the link where the number of vehicles that pass through is lower than a threshold. Japanese Unexamined Patent Application Publication No. 2007-41294 (JP 2007-41294 A) discloses a technology for detecting a newly closed road from a difference between a distribution map of past traveling position data of a vehicle, which has been created using probe data with different collection periods, and a distribution map of future traveling position data of the vehicle.

SUMMARY

However, it is difficult to properly determine whether or not a given road is closed to vehicles in the technologies disclosed in JP 2014-241090 A, JP 2005-284588 A, and JP 2007-41294 A. This is because, in a case where a situation in which no vehicle travels on the given road occurs routinely at a specific time slot, determination cannot be made that the given road is closed just by the fact that the traffic volume at the specific time slot is zero. Whether or not a situation in which no vehicle travels can occur routinely on a given road at the specific time slot may vary from road to road and from day to day, even on the same road. A traffic volume of the given road is also affected by a presence or absence of an event at an area around the given road. It is desirable to determine whether or not the given road is closed to vehicles in consideration of the above described circumstances.

The disclosure provides a traffic volume determination system, a traffic volume determination method, and a non-transitory computer-readable storage medium storing a traffic volume determination program, which are capable of properly determining whether or not a link on a map database (hereinafter referred to as "link") is closed to vehicles.

(US)A first aspect of the disclosure relates to a traffic volume determination system including: a storage device configured to store a first table configured to store information identifying a first link and a second link among a plurality of links, the first link and the second link having a correlation degree, which exceeds a threshold, of a traffic volume, and a second table configured to store information indicating a first reference traffic volume which is a past statistical average traffic volume of the first link, and information indicating a second reference traffic volume which is a past statistical average traffic volume of the second link; and a computer configured to determine that the first link is closed when a probability that an first event and a second event occur at a same time is statistically significantly small, the first event being an event in which an actual traffic volume of the first link is significantly lower than the first reference traffic volume, the second event being an event in which an actual traffic volume of the second link is significantly higher than the second reference traffic volume, and output information that the first link is closed.

(CN)A first aspect of the disclosure relates to a traffic volume determination system including a first table configured to store information identifying a first link and a second link among a plurality of links, the first link and the second link having a correlation degree, which exceeds a threshold, of a traffic volume; a second table configured to store information indicating a first reference traffic volume which is a past statistical average traffic volume of the first link, and information indicating a second reference traffic volume which is a past statistical average traffic volume of the second link; and a determination unit configured to determine that the first link is closed when a probability that an first event and a second event occur at a same time is statistically significantly small, the first event being an event in which an actual traffic volume of the first link is significantly lower than the first reference traffic volume, the second event being an event in which an actual traffic volume of the second link is significantly higher than the second reference traffic volume.

A second aspect of the disclosure relates to a traffic volume determination method including: preparing, by a computer system, a first table configured to store information identifying a first link and a second link among a plurality of links, the first link and the second link having a correlation degree, which exceeds a threshold, of a traffic volume; preparing, by the computer system, a second table configured to store information indicating a first reference traffic volume which is a past statistical average traffic volume of the first link, and information indicating a second reference traffic volume which is a past statistical average traffic volume of the second link; and determining, by the computer system, that the first link is closed when a probability that an first event and a second event occur at a same time is statistically significantly small, the first event being an event in which an actual traffic volume of the first link is significantly lower than the first reference traffic volume, the second event being an event in which an actual traffic volume of the second link is significantly higher than the second reference traffic volume.

A third aspect of the disclosure relates to a non-transitory computer-readable storage medium storing a traffic volume determination program causing a computer system to execute steps of: preparing a first table configured to store information identifying a first link and a second link among a plurality of links, the first link and the second link having a correlation degree, which exceeds a threshold, of a traffic volume; preparing a second table configured to store information indicating a first reference traffic volume which is a past statistical average traffic volume of the first link, and information indicating a second reference traffic volume which is a past statistical average traffic volume of the second link; and determining that the first link is closed when a probability that an first event and a second event occur at a same time is statistically significantly small, the first event being an event in which an actual traffic volume of the first link is significantly lower than the first reference traffic volume, the second event being an event in which an actual traffic volume of the second link is significantly higher than the second reference traffic volume.

With the aspects of the disclosure, it is possible to properly determine whether or not a link is closed to vehicles.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a flowchart showing a flow of a process of a traffic volume determination method according to the embodiment of the disclosure.

DETAILED DESCRIPTION OF EMBODIMENTS

Figure 1:
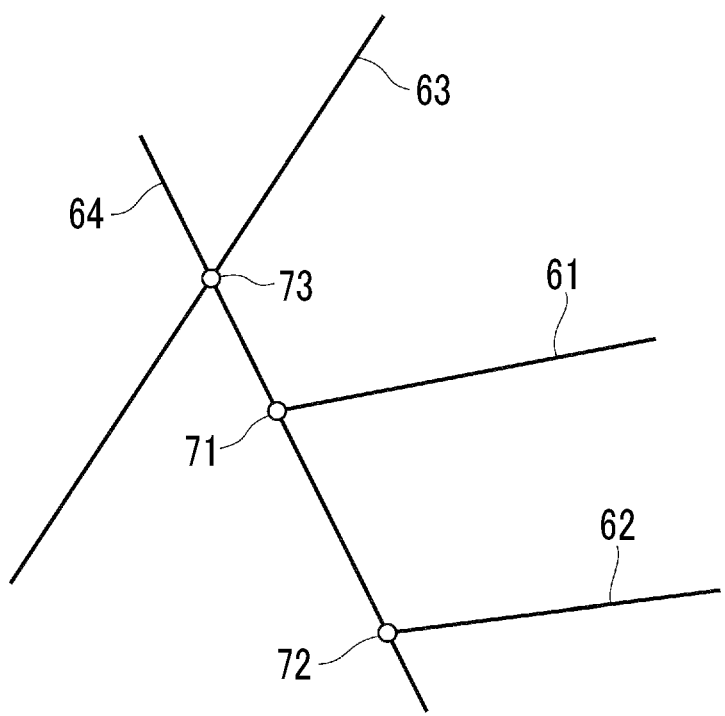
FIG. 1 is a graph showing an example of a connection relationship of a plurality of links according to an embodiment of the disclosure.

Hereinafter, an embodiment of the disclosure will be described with reference to the drawings. In the following description, the same reference numerals denote the same components, and redundant descriptions are omitted. In the embodiment, a network format is exemplified as a data format of nodes and links constituting road map information. The network type is a format in which a road section from a predetermined intersection to another intersection is taken as a graph link according to the graph theory and the intersection is taken as a node of the graph.

FIG. 1 shows an example of a connection relationship of a plurality of links 61, 62, 63, 64. A vehicle traveling on any one of the links 61, 62, 63, 64 can flow into another link through any one of the nodes 71, 72, 73.

Figure 2:
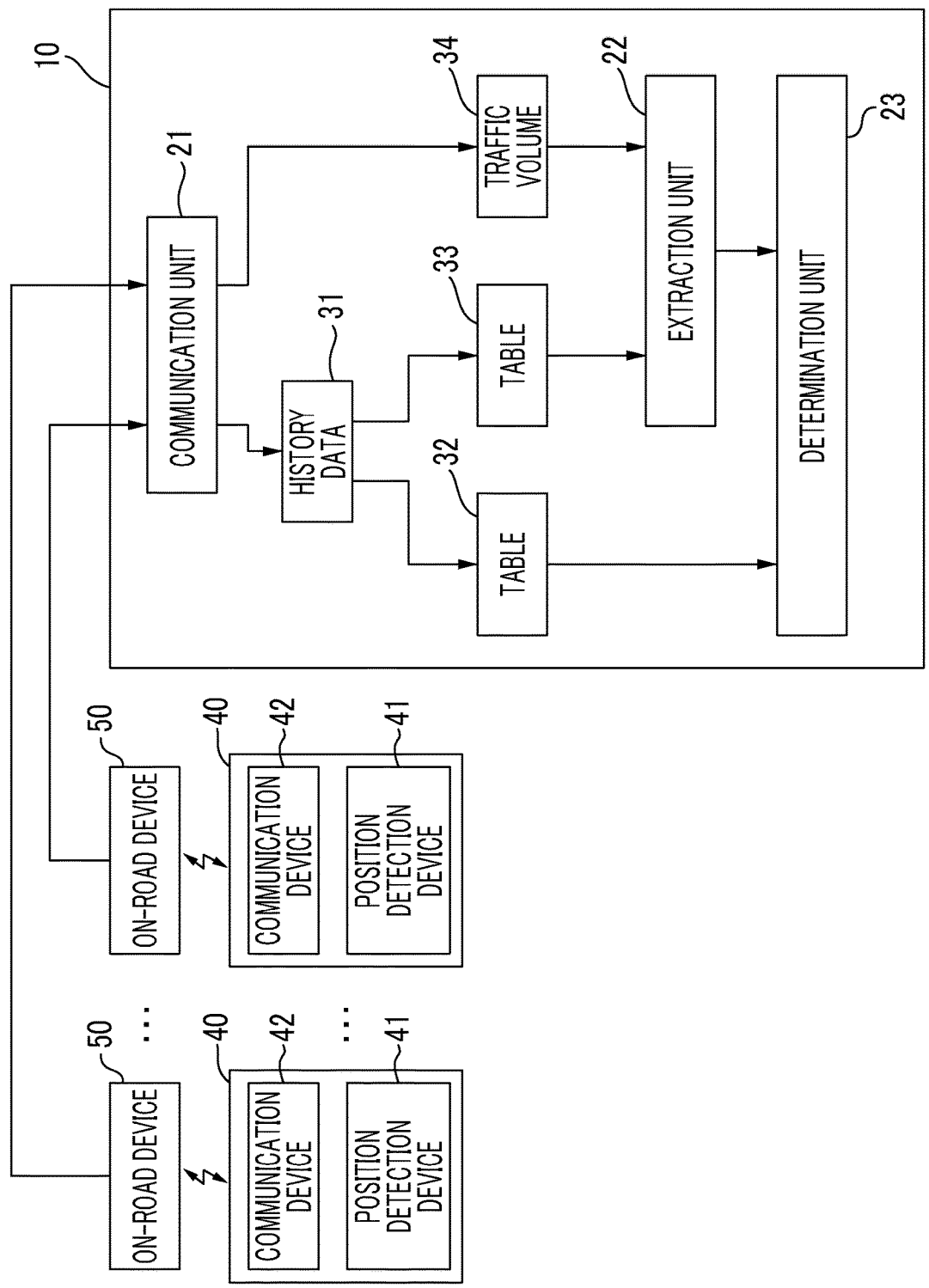
FIG. 2 is an explanatory diagram showing a functional block of a traffic volume determination system according to the embodiment of the disclosure.

FIG. 2 is an explanatory diagram showing a functional block of a traffic volume determination system 10 according to the embodiment of the disclosure. The traffic volume determination system 10 is a computer system that determines traffic volume on the road (the number of vehicles 40 passing through per unit time) based on probe data acquired from a plurality of vehicles 40. Each of the vehicles 40 has a position detecting device 41 for detecting the position of the own vehicle and a communication device 42 for wirelessly transmitting the probe data to on-road devices 50. The probe data contains position information, speed information, and time information of each of the vehicles 40, and each of the vehicles 40 that wirelessly transmits the probe data described above is called a probe car. The position detecting device 41 is, for example, a global positioning system (GPS). The road-to-vehicle communication method between the communication device 42 and the on-road device 50 is, for example, an optical beacon, a wireless local area network (LAN), or a dedicated short range communication (DSRC).

A plurality of on-road devices 50 is disposed along the links 61, 62, 63, 64. The traffic volume determination system 10 collects the probe data received from the vehicles 40 by each of the on-road devices 50, and acquires the information about the traffic volume of the vehicles 40 traveling on the links 61, 62, 63, 64. Since the on-road device 50 is not indispensable, the traffic volume determination system 10 may receive the probe data from the vehicles 40 through wireless communication (for example, a mobile phone line or a dedicated line).

The traffic volume determination system 10 includes a communication unit 21, an extraction unit 22, and a determination unit 23. The traffic volume determination system 10 includes a processor, a storage resource, and a communication interface as hardware resources. The storage resource is a storage area of a computer-readable recording medium (for example, a hard disk drive, a solid-state drive, a memory card, an optical disk drive, or a semiconductor memory). A traffic volume determination program that controls the operation of the traffic volume determination system 10 is stored in the storage resource. The traffic volume determination program is a computer program causing the traffic volume determination system 10 to execute a process of steps 401 to 406 shown in FIG. 4. The functions of the communication unit 21, the extraction unit 22, and the determination unit 23 are realized in cooperation with the hardware resources of the traffic volume determination system 10 and the traffic volume determination program. The functions similar to those of the extraction unit 22 and the determination unit 23 may be realized by using a dedicated hardware resource (for example, an application specific integrated circuit (ASIC)) or a firmware.

The communication unit 21 receives the probe data wirelessly transmitted from the vehicles 40 and stores the received probe data as history data 31 in the storage resource. The history data 31 includes history information relating to the traffic volume of the vehicles 40 traveling on each of the links 61, 62, 63, 64 for a certain period of time from the past to the present.

With reference to the history data 31, the processor of the traffic volume determination system 10 prepares a table 33, in which information indicating a reference traffic volume which is a past statistical average traffic volume for each of the links 61, 62, 63, 64 is stored, and stores the table in the storage resource. For example, when it is assumed that the reference traffic volume of the link 61 is the first reference traffic volume and the reference traffic volume of the link 62 is the second reference traffic volume, information indicating the first reference traffic volume and information indicating the second reference traffic volume are stored in the table 33. The reference traffic volume of the vehicles 40 traveling on each of the links 61, 62, 63, 64 may vary from time slot to time slot on the same day of the week, and may also vary from day to day even in the same time slot.

Therefore, it is desirable that the reference traffic volume of the vehicles 40 traveling on each of the links 61, 62, 63, 64 is sorted out for each time slot and for each day of the week and stored in the table 33. For example, it is desirable to exclude, in advance, exceptional fluctuations in traffic volume which increase or decrease due to accidents or the like to calculate the reference traffic volume of each of the links 61, 62, 63, 64.

With reference to the table 33, the processor of the traffic volume determination system 10 prepares a table 32 that stores information identifying a combination of links which have the correlation degree of the traffic volume exceeding the threshold among the links 61, 62, 63, 64 (for example, a combination of link numbers of links, where each of the links has a strong correlation such that a correlation coefficient of the reference traffic volume exceeds 0.9) and stores the table in the storage resource. For example, it is assumed that the correlation degree between the traffic volumes of the links 61, 62 among the links 61, 62, 63, 64 exceeds the threshold. In this case, the link numbers of the links 61, 62 are each associated with each other and stored, in the table 32, as information identifying a combination of links which have a correlation degree of the traffic volume exceeding the threshold. The link number means an identification number unique to each link.

For each of the links 61, 62, 63, 64, the extraction unit 22 compares a current actual traffic volume 34 with the reference traffic volume of the same time slot and the same day of the week as the current time slot and the current day of the week, which is stored in the table 33, and extracts the link which has the current actual traffic volume 34 that is significantly lower than the reference traffic volume of the same time slot and the same day of the week as the current time slot and the current day of the week. Here, "significantly lower" means that a probability that the actual traffic volume 34 is lower than the reference traffic volume is within the range of a statistical error (for example, the range of twice the standard deviation), but that the probability is rare. For example, the current actual traffic volume 34 of the link 61 among the links 61, 62, 63, 64 is assumed to be significantly lower than the first reference traffic volume of the same time slot and the same day of the week as the current time slot and the current day of the week. In this case, the extraction unit 22 extracts the link 61 among the links 61, 62, 63, 64.

Here, since the links 61, 62 have a strong correlation such that the correlation degree of the traffic volume exceeds the threshold, it is a natural traffic situation that the traffic volume of the link 62 also decreases as the traffic volume of the link 61 decreases. In contrast, even when the traffic volume of the link 61 decreases, in a case where the traffic volume of the link 62 is significantly higher than the second reference traffic volume, a possibility that the link 61 is closed (specifically, a part or all of the traffic volume that should have flowed through the link 61 is flowing into the link 62) is conceivable. The determination unit 23 determines that the link 61 is closed when a probability that an event in which the actual traffic volume 34 of the link 61 is significantly lower than the first reference traffic volume, and an event in which the actual traffic volume 34 of the link 62 is significantly higher than the second reference traffic volume occur at the same time is statistically significantly small. Here, "significantly higher" means that a probability that the actual traffic volume 34 is higher than the reference traffic volume is within the range of the statistical error (for example, the range of twice the standard deviation), but that the probability is rare. Being "statistically significantly small" means being outside the range of the statistical error and small (that is, being small to the extent that a statistically significant difference is observed).

Figure 3:
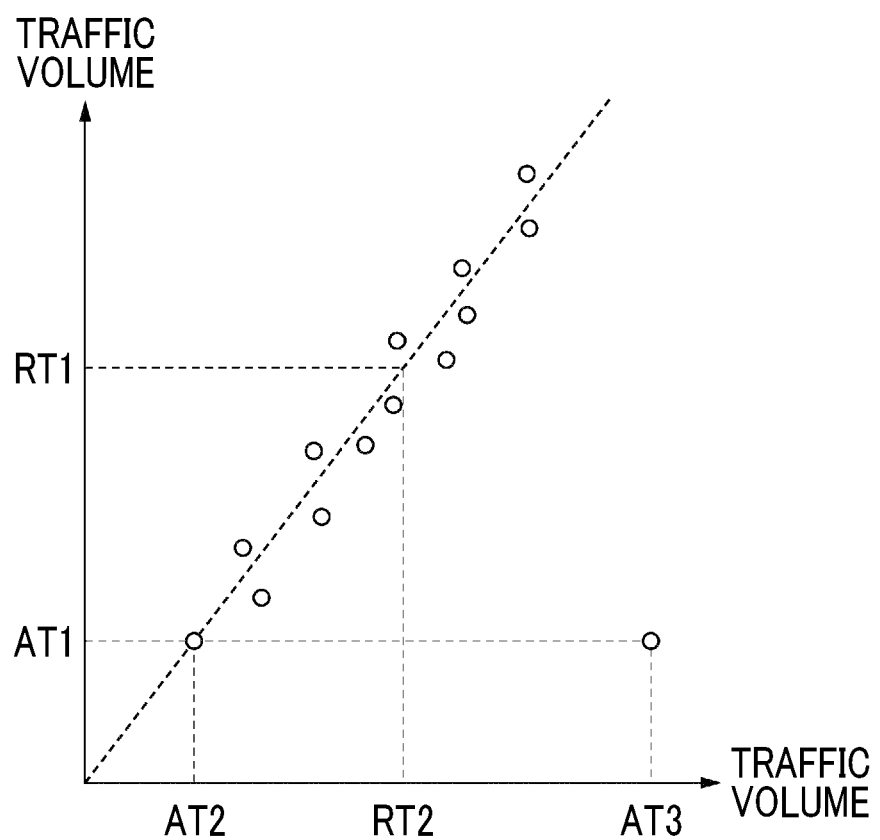
FIG. 3 is a graph showing a correlation between links according to the embodiment of the disclosure.

FIG. 3 is a graph showing the correlation between the links 61, 62. The vertical axis represents the traffic volume of the link 61 and the horizontal axis represents the traffic volume of the link 62. RT1 indicates the first reference traffic volume of the link 61 and RT2 indicates the second reference traffic volume of the link 62. Since the links 61, 62 have a strong correlation such that the correlation degree of the traffic volume exceeds the threshold, in a case where the traffic volume of the link 61 is a traffic volume AT1 which is significantly lower than the first reference traffic volume RT1, it is estimated that the traffic volume of the link 62 also has a traffic volume close to a traffic volume AT2 which is significantly lower than the second reference traffic volume RT2. Contrary to the estimation described above, even when the traffic volume of the link 61 decreases to the traffic volume AT1 which is significantly lower than the first reference traffic volume RT1, in a case where the traffic volume of the link 62 has a traffic volume AT3 that is significantly higher than the second reference traffic volume RT2 with statistically significantly small probability, determination is made that the link 61 is closed.

FIG. 4 is a flowchart showing a flow of a process of a traffic volume determination method according to the embodiment of the disclosure. The processor of the traffic volume determination system 10 prepares the tables 32, 33 with reference to the history data 31 (steps 401 and 402). In a case where the correlation degree of the traffic volume of the links 61, 62 among the links 61, 62, 63, 64 exceeds the threshold, the link numbers of the links 61, 62 are each associated to each other and stored in the table 32 as information identifying the combination of links which have a correlation degree of the traffic volume exceeding the threshold. The information indicating the first reference traffic volume which is the past statistical average traffic volume of the link 61, and the information indicating the second reference traffic volume which is the past statistical average traffic volume of the link 62 are stored in the table 33. The current actual traffic volume 34 of the link 61 among the links 61, 62, 63, 64 is significantly lower than the first reference traffic volume of the same time slot and the same day of the week as the current time slot and the current day of the week. In this case, the extraction unit 22 extracts the link 61 among the links 61, 62, 63, 64 (step 403). When a probability that an event in which the actual traffic volume 34 of the link 61 is significantly lower than the first reference traffic volume, and an event in which the actual traffic volume 34 of the link 62 is significantly higher than the second reference traffic volume occur at the same time is statistically significantly small (step 404: YES), the determination unit 23 determines that the link 61 is closed (step 405). Except for cases in which a probability that an event in which the actual traffic volume 34 of the link 61 is significantly lower than the first reference traffic volume, and an event in which the actual traffic volume 34 of the link 62 is significantly higher than the second reference traffic volume occur at the same time is statistically significantly small (step 404: NO), the determination unit 23 determines that the link 61 is not closed (step 406).

Here, a specific example of determining the closing of the link 61 will be described. For example, it is assumed that the reference traffic volume of the link 61 in a predetermined time slot on a predetermined day of the week is 10 vehicles and the reference traffic volume of the link 62 in the same time slot on the same day of the week is 8 vehicles. In addition, it is assumed that the correlation coefficient of the traffic volume of the links 61, 62 is 0.95 and the ratio of the traffic volume of the link 61 to the traffic volume of the link 62 is 10:8. Under the preconditions described above, a case where the actual traffic volume 34 of the link 61 is significantly lower than 10 vehicles of the reference traffic volume and is 0 vehicles, and the actual traffic volume 34 of the link 62 is significantly higher than 8 vehicles of the reference traffic volume and is 18 vehicles is conceivable. In this case, focusing only on the traffic volume of the link 61 without considering the correlation of the traffic volume between the links 61, 62, the probability that the actual traffic volume 34 of the link 61 is 0 vehicles is rare, but the probability is within the range of the statistical error. Therefore, the fact that the link 61 is in an abnormal traffic situation that is different from those at usual times (that is, being closed) is overlooked. Similarly, focusing only on the traffic volume of the link 62 without considering the correlation of the traffic volume between the links 61, 62, the probability that the actual traffic volume 34 of the link 62 is 18 vehicles is rare, but the probability is within the range of the statistical error. Therefore, even in this case, the fact that the link 61 is in an abnormal traffic situation that is different from those at usual times (that is, being closed) is overlooked. In contrast, in the traffic volume determination method according to the present embodiment, considering the correlation of the traffic volume between the links 61, 62, a probability that an event in which the actual traffic volume 34 of the link 61 is significantly lower than 10 vehicles of the reference traffic volume and is 0 vehicles, and an event in which the actual traffic volume 34 of the link 62 is significantly higher than 8 vehicles of the reference traffic volume and is 18 vehicles occur at the same time is statistically significantly small, and thus it is possible to detect that the link 61 is in an abnormal traffic situation that is different from those at usual times (that is, being closed).

With the present embodiment, by focusing on the links 61, 62 which have a correlation degree of traffic volume exceeding the threshold among the links 61, 62, 63, 64, and by determining whether or not a probability that an event in which the actual traffic volume 34 of the link 61 is significantly lower than the reference traffic volume and an event in which the actual traffic volume 34 of the link 62 is significantly higher than the reference traffic volume occur at the same time is statistically significantly small, it is possible to properly determine whether or not the link 61 is closed.

The method of measuring the traffic volumes of the links 61, 62, 63, 64 is not limited to the method of acquiring the probe data from the vehicles 40, and a known method of measuring the number of the vehicles 40 passing through the links (for example, a method using a camera for detecting the vehicles 40 by image recognition, a laser level sensor for detecting the vehicles 40 using a laser, an ultrasonic sensor for detecting the vehicles 40 using ultrasonic waves, or a loop coil for detecting the vehicles 40 using an electromagnetic field) may be used. Therefore, in the specification, "vehicle" means a vehicle under the Road Traffic Act and is not limited to a probe car. Examples of the vehicle under the Road Traffic Act include automobiles, motorized bicycles, light vehicles, and trolley buses.

The above described embodiment is for facilitating the understanding of the disclosure, and is not intended to be construed as limiting the disclosure. The disclosure can be modified or improved without departing from the spirit of the disclosure, and the disclosure includes equivalents thereof. That is, those in which design modifications are appropriately made to the embodiment by those skilled in the art are also included in the scope of the disclosure as long as they have the features of the disclosure. Each element included in the embodiment can be combined as far as technically possible and the combination of these elements is also within the scope of the disclosure as long as the features of the disclosure are included.

What is claimed is:

1. A traffic volume determination system comprising:
   a storage device configured to store
      a first table configured to store information identifying a first link and a second link among a plurality of links, the first link and the second link having a correlation degree, which exceeds a threshold, of a traffic volume, and
      a second table configured to store information indicating a first reference traffic volume which is a past statistical average traffic volume of the first link, and information indicating a second reference traffic volume which is a past statistical average traffic volume of the second link; and
   a computer configured to
      determine that the first link is closed when a probability that an first event and a second event occurs at a same time is outside the range of a statistical error, the first event being an event in which an actual traffic volume of the first link is significantly lower than the first reference traffic volume, the second event being an event in which an actual traffic volume of the second link is significantly higher than the second reference traffic volume, and
      output information that the first link is closed.

2. A traffic volume determination method for a computer system comprising:
   preparing, by a computer system, a first table configured to store information identifying a first link and a second link among a plurality of links, the first link and the second link having a correlation degree, which exceeds a threshold, of a traffic volume;
   preparing, by the computer system, a second table configured to store information indicating a first reference traffic volume which is a past statistical average traffic volume of the first link, and information indicating a second reference traffic volume which is a past statistical average traffic volume of the second link; and
   determining, by the computer system, that the first link is closed when a probability that an first event and a second event occurs at a same time is outside the range of a statistical error, the first event being an event in which an actual traffic volume of the first link is significantly lower than the first reference traffic volume, the second event being an event in which an actual traffic volume of the second link is significantly higher than the second reference traffic volume.

3. A non-transitory computer-readable storage medium storing a traffic volume determination program causing a computer system to execute steps of:
   preparing a first table configured to store information identifying a first link and a second link among a plurality of links, the first link and the second link having a correlation degree, which exceeds a threshold, of a traffic volume;
   preparing a second table configured to store information indicating a first reference traffic volume which is a past statistical average traffic volume of the first link, and information indicating a second reference traffic volume which is a past statistical average traffic volume of the second link; and determining that the first link is closed when a probability that an first event and a second event occurs at a same time is outside the range of a statistical error, the first event being an event in which an actual traffic volume of the first link is significantly lower than the first reference traffic volume, the second event being an event in which an actual traffic volume of the second link is significantly higher than the second reference traffic volume.

\* \* \* \* \*